Dec. 14, 1926.
J. KRUEGER
1,610,953
GUARD RAIL FOR LOADING SKIPS
Filed April 30, 1926
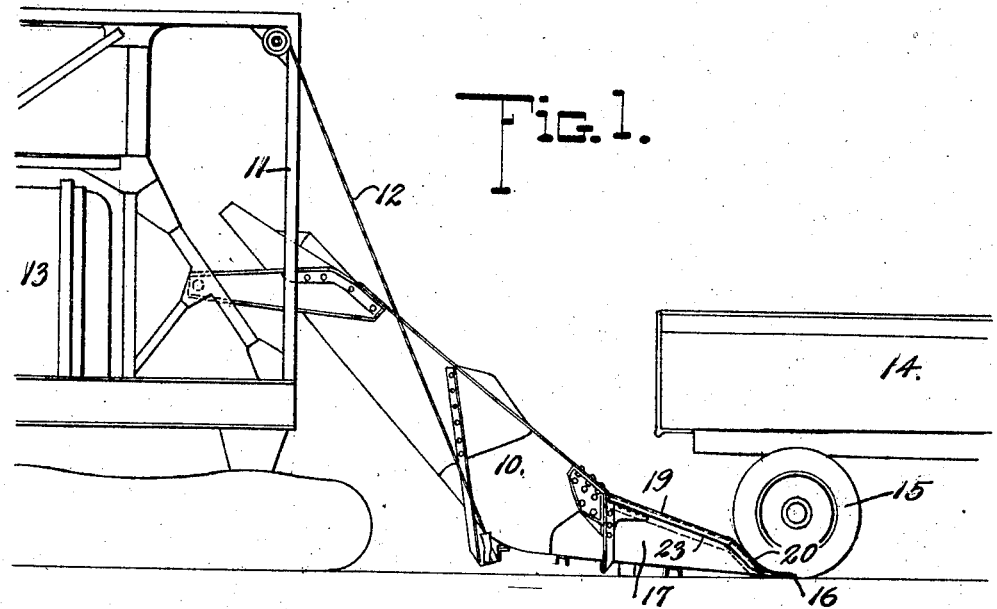
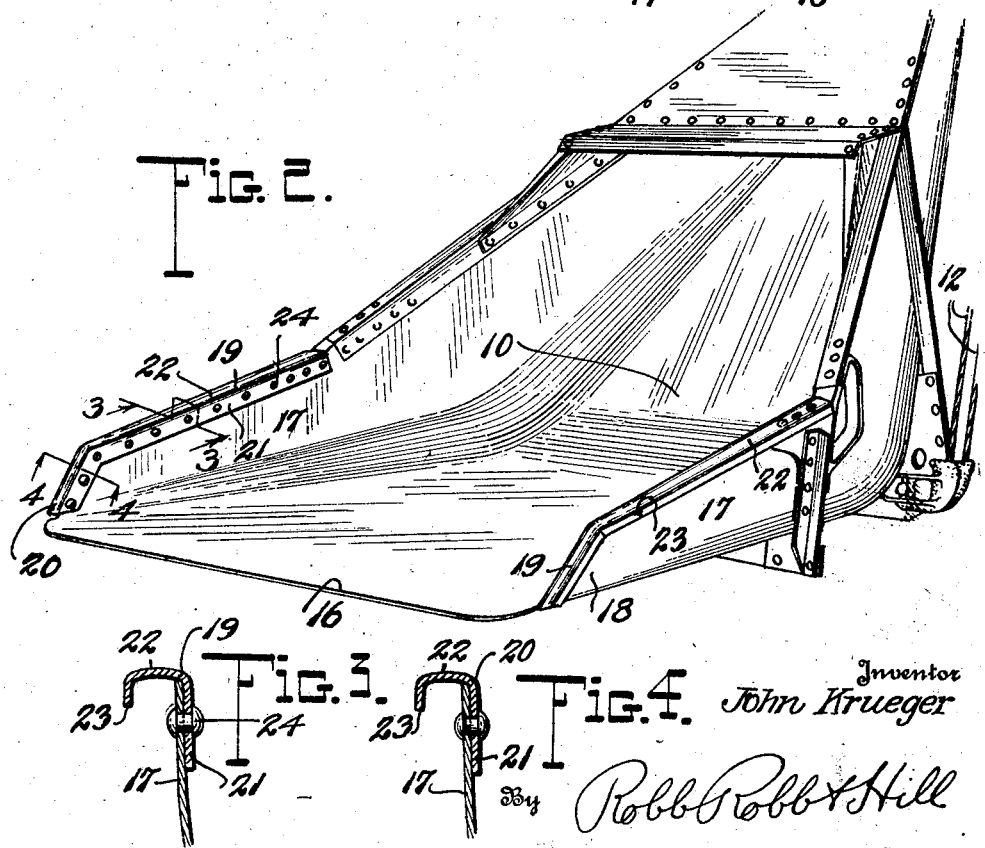
Inventor
John Krueger
By Robb Robb & Hill
Attorneys 1,610,953

Patented Dec. 14, 1926.

UNITED STATES PATENT OFFICE.

JOHN KRUEGER, OF MILWAUKEE, WISCONSIN, ASSIGNOR TO KOEHRING COMPANY, OF MILWAUKEE, WISCONSIN, A CORPORATION.

GUARD RAIL FOR LOADING SKIPS.

Application filed April 30, 1926. Serial No. 105,849.

This invention relates to a guard rail for loading skips, and particularly to a construction adapted for use in connection with a concrete or other mixer of the type in which the skip contacts with the ground and is raised into a discharging position.

These skips are usually formed with vertically disposed thin side edges at their free end which frequently become quite sharp and in any event act to cut or injure the tires of a vehicle wheel brought into contact therewith as the vehicle is moved into position to dump into the skip. Such thin edges are also liable to be bent or crushed if engaged on either side by the vehicle tires.

In practical experience it has been found that when a vehicle carrying material is backed into position to dump into the skip the tires frequently engage the side edges of the skip and the resultant injury thereto causes much expense and delay because of the practical impossibility of moving the vehicle in such a direct line as to avoid contact with the sides of the skip. Likewise, if these side walls become bent from such contact with the vehicle tire the containing efficiency of the skip is reduced as there is a liability of loss of material when the skip is raised from its loading to its discharging position.

While the upper faces of the side walls of the skip have in some instances been reinforced by angle irons, still such irons have not been carried downward to protect the vertically inclined front edges of the walls and often present a horizontal flange liable to injure a tire if brought into side contact therewith such as scraping the side wall of the tire where the rubber covering is most liable to injury.

In order to overcome these objections it is desirable to provide a guard rail for the free edges of the skip walls which not only reinforce the same but also present an enlarged surface which protects a vehicle tire against injury from contact with the walls. Such a guard rail may be formed as an article of manufacture independent of the skip and applied thereto, or constructed as part of the skip; and in its preferred application the rail comprises a substantially channel-shaped strip having its forward portion inclined at an angle to the body which covers the upper or vertical edge of the side wall of the skip.

The invention has for an object to provide a novel and improved construction of guard rail for the free edges of the side walls of a receiving container and comprises an attaching flange and a laterally disposed projecting flange extending over or adjacent to such edges.

A further object of the invention is to provide such a guard rail of substantially channel-shaped cross section with an angularly disposed portion at the front face of the side wall of the skip.

Another object of the invention is to present a novel construction of skip having its front edges protected by a guard rail to prevent injury to the tires of a vehicle if contacted therewith.

Other objects and advantages of the invention will be hereinafter set forth and the novel features thereof defined by the appended claims.

In the accompany drawing:—

Figure 1 is a side elevation showing the invention in its relation to a vehicle;

Figure 2 is a perspective of the skip;

Figure 3 is a section on the line 3—3 of Figure 2; and

Figure 4 is a similar view on the line 4—4 of Figure 2.

Like reference characters designate corresponding parts throughout the several figures of the drawing.

The invention is adapted for application to any desired construction of skip which is lowered into a position substantially contacting with the ground and may also be applied to other forms of receiving containers into which material is dumped from a vehicle brought into alignment therewith.

In the application of the invention shown, the numeral 10 designates the body of the skip which may be of any desired construction and is pivotally supported from the frame 11 of a concrete mixer so as to be raised into a dumping position by means of a cable 12 of the ordinary construction to discharge its contents into a mixing drum. The skip when in loading position is lowered into contact with the ground as shown in Figure 1 and adapted to receive the aggregates or material from a vehicle 14 the wheels 15 of which are usually backed into contact with and above the free edge 16 of the skip which extends beyond the side walls 17 thereof. This requires accuracy in the manipulation of the vehicle as the wheel tires must enter between the side walls and this is one of the primary causes for injury to such tires either by scraping such walls or by directly engaging the sharp edges thereof. The vehicle when so positioned dumps its aggregates into the body of the skip at the rear of the edge 16 so that they are properly discharged when the skip is in raised position.

The side walls 17 are disposed in a substantially vertical plane and are inclined at 18 downwardly at the front of the skip adjacent the free edge 16. The protecting rails 19 are adapted to enclose the top and front edges of these side walls and the forward portion 20 of such rails is disposed at an angle to the body 19 thereof to properly fit the inclination of the front face 18, which is disposed tangential to the tire tread to form a contact face. These rails are preferably of a substantially channel-shaped cross section having an attaching plate 21 and a laterally disposed portion 22 which projects outwardly over the edge of the side 17 and thence downwardly as at 23 to avoid a thin or sharp side edge which would be present if an L-shaped angle iron were used in such position. The rail is secured to the side walls of the skip in any desired manner, for instance by rivets 24.

The functions and operation of the invention will be apparent from the foregoing description from which it will be seen that the application of the guard rail to the side walls of the skip primarily prevent injury to the tires of the vehicle when backed into engagement with the skip for dumping purposes and further protect such walls against bending or displacement by the reinforcing function of the strip.

While the invention has been specifically shown and described, changes and alterations may be made therein, for instance in the cross section of the protecting rail and its angular formation, without departing from the spirit of the invention as defined in the appended claims.

Having thus described my invention, what I claim as new and desire to secure by Letters Patent of the United States is:—

1. A guard rail for the free edges of the side walls of a receiving container, comprising an attaching flange and a laterally disposed protecting flange extending over such edges.

2. A guard rail for the free edges of the side walls of a receiving container, comprising an attaching flange and a laterally disposed protecting flange extending over such edges and downwardly projected at its free edge.

3. A guard rail for the free edges of the side walls of a receiving container, comprising an attaching flange and a laterally disposed protecting flange having an angularly disposed forward portion at the front edge of the side walls of the container, said flanges constituting a channel shaped portion in cross section.

4. A guard rail for a skip having a vertical attaching flange and a laterally disposed protecting portion terminating in a downwardly projected free edge, and a skip having vertically disposed side walls with inclined front edges to receive said guard rail.

5. A skip having at its front edges a relatively wide protecting guard rail disposed at a tangent to the tread of a vehicle tire if contacted therewith, so as to prevent injury to such tires.

In testimony whereof I affix my signature.

JOHN KRUEGER.